United States Patent [19]

Kawamura et al.

[11] Patent Number: 4,472,343

[45] Date of Patent: Sep. 18, 1984

[54] TUBULAR FILM PROCESS

[75] Inventors: Shinji Kawamura; Masato Doi, both of Chiba, Japan

[73] Assignee: Idemitsu Petrochemical Co., Ltd., Tokyo, Japan

[21] Appl. No.: 443,724

[22] Filed: Nov. 22, 1982

[30] Foreign Application Priority Data

Nov. 28, 1981 [JP] Japan .............................. 56-191011
Jun. 21, 1982 [JP] Japan .............................. 57-106486
Jun. 21, 1982 [JP] Japan .............................. 57-106487

[51] Int. Cl.³ .............................................. B29F 3/08
[52] U.S. Cl. .................................... 264/565; 264/566; 264/569; 425/72 R; 425/326.1
[58] Field of Search ........................ 264/569, 564–566; 425/72 R, 326.1

[56] References Cited

U.S. PATENT DOCUMENTS

| | | | |
|---|---|---|---|
| 3,867,083 | 2/1975 | Herrington | 425/326.1 |
| 3,880,974 | 4/1975 | Nohtomi et al. | 264/567 |
| 3,898,028 | 8/1975 | Upmeier | 425/326.1 |
| 3,904,342 | 9/1975 | Sato et al. | 425/326.1 |
| 3,950,466 | 4/1976 | Hasler | 264/567 |
| 4,105,380 | 8/1978 | Zimmermann | 425/326.1 |
| 4,118,453 | 10/1978 | Herrington | 264/569 |
| 4,174,932 | 11/1979 | Herrington | 425/326.1 |
| 4,341,729 | 7/1982 | Hayashi et al. | 425/326.1 |

FOREIGN PATENT DOCUMENTS

| | | | |
|---|---|---|---|
| 2132098 | 1/1973 | Fed. Rep. of Germany | 425/326.1 |
| 50-1173 | 1/1975 | Japan | 264/564 |
| 426853 | 2/1975 | U.S.S.R. | 425/72 R |
| 431022 | 5/1975 | U.S.S.R. | 264/569 |

Primary Examiner—Jeffery R. Thurlow
Attorney, Agent, or Firm—Flynn, Thiel, Boutell & Tanis

[57] ABSTRACT

A tubular film process wherein molten resin is extruded from an extrusion die into a tubular resin, blown by an internal pressure, cooling air is discharged at least at a point between the vicinity of the extrusion die and the vicinity of a bubble expansion ending point in a direction of the extrusion of the resin and in a direction opposite to the extrusion of the resin to, thereby cool the tubular resin, and the tubular resin is continuously taken up upon being cooled and solidified. The cooling air has higher flow rate in the extrusion direction. The cooling air is discharged not only in the direction of the extrusion of the resin but also in the direction opposite to the extrusion of the resin, whereby hot air stream is prevented from accompanying the flow of the resin, thus enabling to effectively cool the tubular resin.

14 Claims, 9 Drawing Figures

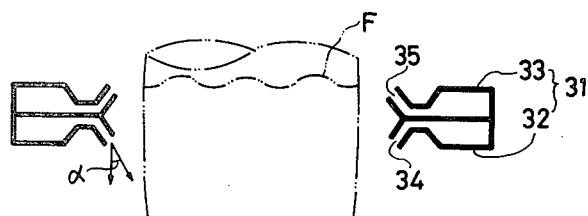
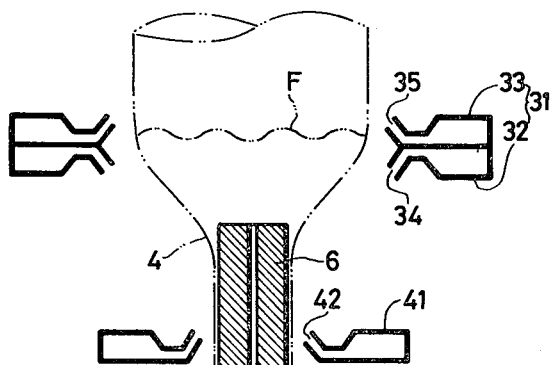
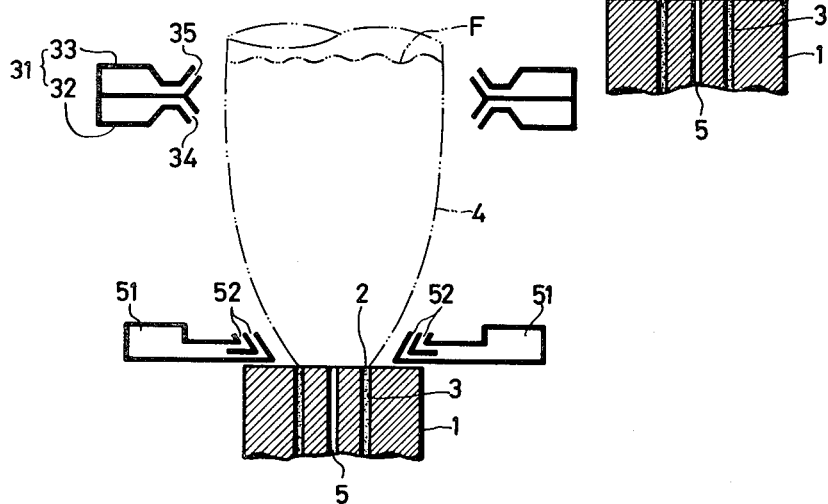
FIG. 5
FIG. 6
FIG. 7

TUBULAR FILM PROCESS

BACKGROUND OF THE INVENTION

1. Field of the Invention

This invention relates to a tubular film process for a thermoplastic resin, and more particularly to improvements in a process of cooling molten resin extruded from an extrusion die.

2. Description of the Prior Art

In forming a blown film, in order to effect a high speed forming (a high extrusion output) to improve the productivity and to obtain a high quality film as well, it is necessary to cool a molten resin satisfactorily.

Heretofore, the most common blown film forming process has been such an arrangement that only one air ring to discharge cooling air in a direction of extrusion of the resin is disposed on an extrusion die and cooling air is blown out onto the outer peripheral surface of the molten resin, which has been extruded in a tubular form, by use of this air ring.

However, in the forming process of the type described, a hot air stream heated to a high temperature by heat exchange with the molten resin of a high temperature immediately after the resin has been extruded from the extrusion die accompanies the outer peripheral surface along the flow of the resin for a long period of time, thereby preventing a satisfactory cooling effect to the tubular resin. Moreover, if a discharge flow rate of the cooling air is increased to enhance the cooling effect, then the forming stability is hindered to a great extent, and hence, there has naturally been a limit imposed on the improvements in cooling effect by the process of the type described.

Now, there have been proposed a process wherein two air rings are provided for discharging cooling air in a direction of extrusion of the resin in two stages in the vertical direction (Japanese Patent "Kokai"(Laid-Open) No. 146764/78 and Japanese Patent "Kokoku"-(Post-Exam. Publn.) No. 14295/82) and another process wherein a vacuum attracting mechanism is provided between the aforesaid air rings disposed in two stages, and a hot air stream of high temperature heated by the outer peripheral portion of the tubular resin is removed from the outer peripheral portion of the resin by means of this vacuum attracting mechanism (Japanese Patent "Kokai"(Laid-Open) No. 29370/79).

However, in the processes described above, the mechanisms are complicated, particularly, in the case of providing the vacuum attracting mechanism, a large-scale installation is needed, the operational control is difficult to perform, and the stable forming at high speed is not easily performed. Furthermore, except the above-described processes, for example, there has been known a process of cooling the tubular resin with water from outside or inside, however, similarly to the above, the installation has been very complicated and operational control has been very difficult to perform.

SUMMARY OF THE INVENTION

The present invention has as its object the provision of a tubular film process wherein no complicated installation is needed, the operation is easily performed, the cooling effect is high and a high quality film can be easily formed at high speed.

To achieve the above-described object, the present invention contemplates that cooling air is discharged toward a tubular resin extruded from an extrusion die at least at one position from the vicinity of the extrusion die to the vicinity of a bubble expansion ending point in a direction of the extrusion of the resin and in a direction opposite to the extrusion of the resin, so as to prevent a hot air stream from accompanying the flow of the resin, and the cooling air is caused to be discharged from a position close to a bubble expansion region, which is a region requiring the cooling to the utmost, to thereby cool the tubular resin.

BRIEF DESCRIPTION OF THE DRAWINGS

FIGS. 5 through 9 are sectional views the outlines of the arrangement of the forming apparatuses, to which second through sixth embodiments are applied.

DETAILED DESCRIPTION OF THE PREFERRED EMBODIMENTS

Figure 1:
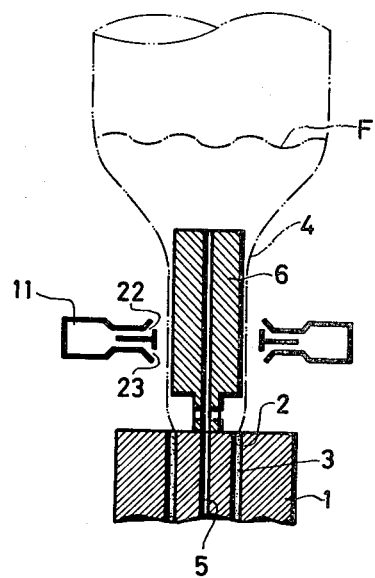
FIG. 1 is a sectional view showing the outline of the arrangement of a forming apparatus, to which a first embodiment of the tubular film process according to the present invention is applied.

FIG. 1 shows the outline of the arrangement of the forming apparatus, to which the first embodiment of the tubular film process according to the present invention is applied. In this drawing, molten resin 3 is continuously extruded from an annular slit 2 of an extrusion die 1 so as to provide a tubular resin 4. In this tubular resin 4, compressed air under pressure of a predetermined value fed from a sealed air path 5 of the extrusion die 1 is injected. Due to an internal pressure of this compressed air, the tubular resin 4 is expanded at a predetermined blow-up ratio, nipped by nip rollers, not shown, which would be positioned upwardly in the drawing if shown, upon cooling and solidification of the tubular resin 4 thus expanded, and continuously taken up at a predetermined speed.

Here, as the materials of the molten resin 3, there are used common thermoplastic resins including low-density polyethylene, chainlike low-density polyethylene, high-density polyethylene, polypropylene, polystyrene, ethylene-vinyl acetate copolymer, polyvinyl chloride and the like.

The tubular resin 4 extruded from the extrusion die 1 has substantially the same diameter during its movement from the extrusion die 1 to a position of a predetermined height, is subsequently rapidly expanded in a bubble expansion region, and a frost line F appears thereon immediately before a bubble expansion ending point. Here, the bubble expansion ending point refers to a point where the tubular resin 4 obtains a final diameter of a predetermined value after the tubular resin 4, which has been expanded in diameter in the bubble expansion region, finally terminates its expansion, and the frost line F refers to a border line where a rapidly changed transparency of the tubular resin 4 is visible from outside, the border line being formed when the tubular resin 4, which has been extruded from the extrusion die 1, is changed from the molten state to the solidified state. A columnar center core 6 affixed to the extrusion die 1 is provided in the tubular resin 4. For example, this center core 6 may be one shown in Japanese Patent "Kokoku"(Post-Exam. Publn.) No. 46296/80 or the like.

An air ring 11 is disposed at an intermediate position between the extrusion die 1 and the frost line F in a manner to surround the tubular resin 4, and the height of the air ring 11 is variable.

Figure 2:
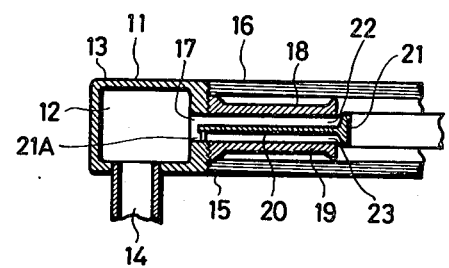
FIG. 2 is an enlarged sectional view showing an example of the construction of the air ring used in the aforesaid forming apparatus.

As enlargedly shown in FIG. 2, the air ring 11 is provided with an annular hollow member 13 of a substantially square shape in cross section, as a main body of the air ring, and having an annular air flow path 12. Connected to this annular hollow member 13 is an air feed pipe 14, whence air for cooling the thermoplastic resin is fed to an annular air flow path 12.

The inner peripheral edge 15 of the annular hollow member 13 is formed with a threaded portion 16 over the entire circumference thereof, and the central portion of the inner peripheral edge 15 is penetratingly provided with an air flowout opening 17 having a predetermined width in the circumferential direction thereof.

Threads formed on the outer peripheral edge of the annular upper vane 18 are threadably coupled to the threaded portion 16 disposed on the side of the direction of the extrusion of the resin of the inner peripheral edge 15 with respect to the air flowout opening 17, i.e., on the upper side in the drawing, while threads formed on the outer peripheral edge of the annular lower vane 19 are threadably coupled to the threaded portion 16 disposed on the side of the direction opposite to the extrusion of the resin, whereby air flowing out of the air flowout opening 17 is guided toward the inner central portion of the annular hollow member 13.

Provided between an upper vane 18 and a lower vane 19 is an annular partition plate 20. The inner peripheral end edge of the partition plate 20 projects slightly further than the upper vane 18 and the lower vane 19 toward the inner central portion of the annular hollow member 13, and this end edge is formed with a projecting edge 21 projecting by a predetermined value upwardly and downwardly.

The outer peripheral edge of the partition plate 20 is positioned at the central portion of the air flowout opening 17 and affixed to the annular hollow member 13 by means of a plurality of fixing portions 21A formed at predetermined intervals in the circumferential direction on the outer peripheral edge, whereby air flowing out of the air flowout opening 17 is separated into two by means of the partition plate 20.

The air passing through a space defined by the partition plate 20 and the upper vane 18 is discharged from an upwardly directed slit 22 acting as a cooling air discharging slit defined by the inner peripheral side end edge of the upper vane 18 and the projecting edge 21 in the direction of the extrusion of the resin, while the air passing through a space defined by the partition plate 20 and the lower vane 19 is discharged from a downwardly directed slit 23 acting as a cooling air discharging slit in the direction opposite to the extrusion of the resin.

Additionally, the widths of the upwardly directed slit 22 and the downwardly directed slit 23 are continuously varied either to the widening direction or to the narrowing direction by adjusting the threadably coupled positions of the upper vane 18 and the lower vane 19 at the threaded portion 16, respectively, so that the air quantities discharged from the upwardly directed slit 22 and the downwardly directed slit 23 can be adjusted continuously or steplessly.

Figure 3:
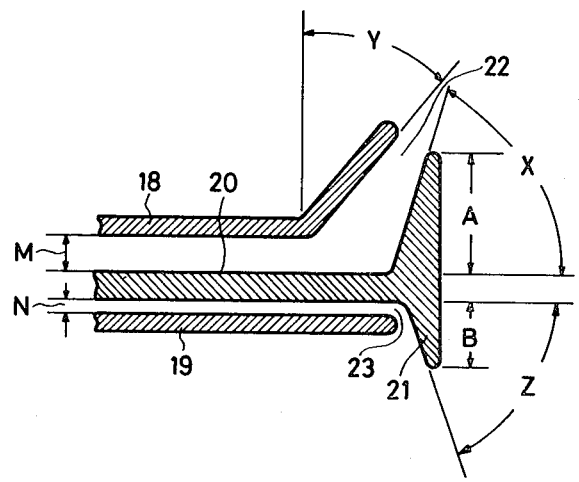
FIG. 3 is an enlarged sectional view showing the essential portions of the air ring.

FIG. 3 further shows a preferable example of constructions of the slits 22 and 23 of the air ring 11 in the case where the air ring 11 is disposed at a position closer to the lower portion in the drawing, i.e., the side of the extrusion die 1 rather than the bubble expansion region, in the same manner as in the present embodiment.

In this drawing, a ratio of a width A of the projecting edge 21 in the direction of the extrusion of the resin and a width B of the projecting edge 21 in the direction opposite to the extrusion of the resin is suitably changed to a preferable value for the resin to be used and the forming process (bubble shape) and the like. An interval M between the upper vane 18 and the partition plate 20 and an interval N between the lower vane 19 and the partition plate 20 are substantially in the relationship of $1 < M/N < 10$. Furthermore, angles indicated by X and Z in the drawing are substantially 75° and an angle indicated by Y in the drawing is substantially 45°, whereby the cooling air discharged from the upwardly directed slit 22 is throttled to be biased.

Description will now be given of operation of the present embodiment.

The tubular resin 4 extruded from the extrusion die 1 is cooled by the cooling air discharged downward from the downwardly directed slit 23 of the air ring 11, i.e., in the direction opposite to the extrusion of the resin. In this case, heated air above the extrusion die 1 is expelled from the vicinity of the outer periphery of the tubular resin 4 by the air discharged downward from the air ring 11, so as to prevent the heated air from surrounding the periphery of the tubular resin 4 and being accompanied by the flow of the tubular resin 4.

The tubular resin 4 upon being extruded from the extrusion die 1 has a low melt tension, but is cooled efficiently by the downwardly directed slit 23, whereby the melt tension progressively increases in the direction of the extrusion of the resin, so that a stable condition thereof can be maintained even during the formation at high speed.

The tubular resin 4, which has passed the air ring 11, being further cooled by the cooling air discharged from the upwardly directed slit 22, is expanded into a bubble in the bubble expansion region, and a frost line F is formed at a predetermined position of this bubble. In this case, the cooling air is blown against the bubble expansion region needing the cooling to the utmost from a short distance, and consequently, the cooling air being at low temperature and unweakened in the flowing velocity is blown against the bubble expansion region.

Furthermore, above the air ring 11, there occurs no such condition where the air, which has been heated by the tubular resin 4 beneath the air ring 11, accompanies the outer periphery of the tubular resin 4. In consequence, the tubular resin 4 as a whole is efficiently cooled by the air discharged from the upwardly directed slit 22.

As described above, the tubular resin 4 is efficiently cooled beneath and above the air ring 11, respectively, the frost line F is held at a predetermined position even during the formation at high speed.

The position where the air ring 11 is disposed is made variable at the intermediate point between the extrusion die 1 and the frost line F, and may be disposed at a suitable point depending upon the type of the resin extruded, the conditions of formation and the like.

However, as in the present embodiment, when the cooling is effected by means of the air ring 11 having a small diameter as compared with that of the tubular resin 4 after the completion of expansion of the tubular resin 4, if the position of the air ring 11 is excessively close to the extrusion die 1, then the cooling by means of the downwardly directed slit 23 is not satisfactorily attained. On the contrary, if the position of the air ring 11 is excessively close to the frost line F, then there occurs a possibility of the air ring 11 coming into contact with the tubular resin 4, etc., to thereby endanger the stability. In consequence, normally, the position of the air ring 11 is preferably set within the range of 1/10H–9/10H, where H is a height from the extrusion die 1 to the frost line F.

In order to adjust the quantities of cooling air discharged from the air ring 11 in the direction of the extrusion of the resin and in the direction opposite to the extrusion of the resin, the upper vane 18 and the lower vane 19 should be rotated relative to the annular hollow member 13 as being the main body of the air ring, respectively, so that the slit widths of the upwardly directed slit 22 and the downwardly directed slit 23 can be adjusted, respectively.

In the present embodiment with the above-described arrangement, the resin can be highly efficiently cooled, insufficiency in cooling and ununiformity in cooling condition do not occur even during the formation at high speed, irregular breathing (i.e. the diameter of the tubular resin is irregularly increased or decreased) and movement in a zigzag fashion is prevented from occurring, and such advantages can be offered that the film having no irregularities in thickness and in width, wrinkles and the like can be manufactured stably and with high productivity.

Furthermore, the tubular resin 4 can be satisfactorily cooled even during the formation at high speed, so that the frost line F can be held at a predetermined position. In consequence, there is no possibility of blocking by the nip rolls.

It is a common practice that the molten resin 3 used in the present embodiment is a thermoplastic resin. Satisfactory cooling can be rendered to low-density polyethylene being low in melt tension, polypropylene, etc., the formation of which at high speed and in large thickness have been difficult, and high-density polyethylene and the like, the height of the frost line F of which have been needed to be increased, so that the formation at high speed of the above-mentioned resin materials can be performed stably and with high productivity.

Further, the quantities of the cooling air discharged in the direction of the extrusion of the resin and in the direction opposite to the extrusion of the resin and the angles of discharge can be adjusted easily, independently of each other, and steplessly by adjusting the threadably coupled positions at the threaded portions 16 of the upper vanes 18 and the lower vane 19. In consequence, the optimum cooling conditions in accordance with the type of resin, conditions of formation, purpose of formation and the like can be easily materialized.

Detailed description will hereunder be given of the present embodiment with reference to examples and comparative examples to be described below.

EXAMPLES 1 THROUGH 3

High-density polyethylene (density ... 0.955 g/cm$^3$, melt index ... 0.05 g/10 min) was extruded from an extrusion die 1 provided with an annular slit 2 having a diameter of 80 mm in an extruder having a bore diameter of 55 mm, whereby a blown film having a folded width 550 mm and a thickness of 25 μm is formed. In this case, the center core 6 having a diameter of 95 mm and a length of 500 mm was used.

Forming temperature ... 200° C.

Cooling method ... An air ring 11 (of an inner diameter of 130 mm), the air discharging slits 22 and 23 (width A is equal to 20 mm, width B is equal to 10 mm) of which are provided both in the direction of the extrusion of the resin and in the direction opposite to the extrusion of the resin, was disposed at a point spaced 50 mm apart from the extrusion die 1 in the first example, at a point spaced 100 mm apart from the extrusion die 1 in the second example and at a point spaced 200 mm apart from the extrusion die 1 in the third embodiment between the extrusion die 1 and the frost line F of the bubble. The cooling air was discharged both in the direction of the extrusion of the resin and in the direction opposite to the extrusion of the resin.

The resin extrusion outputs, capable of being stably formed, were studied and the results will be shown in Table 1.

COMPARATIVE EXAMPLE 1

The resin extrusion outputs capable of being stably formed were studied under the same conditions as in the aforesaid Examples 1 through 3 except that an air ring to discharge only in the direction of the extrusion of the resin was provided on the extrusion die. The results will be shown in Table 1.

TABLE 1

|  | Example 1 | Example 2 | Example 3 | Comparative example 1 |
|---|---|---|---|---|
| Ratio of quantities of air discharged from the air ring in the direction of the extrusion of the resin and in the direction of opposite to the extrusion of the resin (Direction of extrusion: Direction opposite to extrusion) | 5:1 | 4:1 | 3:1 |  |
| Position of air ring from extrusion die (mm) | 50 | 100 | 200 | 0 |
| Position of frost line from extrusion die (mm) |  |  | 400 |  |
| Resin extrusion outputs, capable of being stably formed (kg/h) | 55 | 60 | 65 | 40 |

EXAMPLES 4 THROUGH 6

Except that the resin extrusion output was set at 40 kg/h and the folded width of the formed film is 400 mm, the formation was effected by use of the same resin and the same extruder at the same temperature of formation as in the preceding examples 1 through 3. In this case, the forming stability for the various thicknesses were studied, while the height of the air ring 11 was being changed, and the results will be shown in Table 2.

COMPARATIVE EXAMPLE 2

The forming stability was studied in the same manner as in the examples 4 through 6 under the same conditions as in the examples 4 through 6. However, the conventional air ring (of an inner diameter 130 mm) to discharge air only in the direction of the extrusion of the resin was provided on the extrusion die. The results will be shown in Table 2.

TABLE 2

|  |  | Example 4 | Example 5 | Example 6 | Comparative example 2 |
|---|---|---|---|---|---|
| Ratio of quantities of air discharged from air ring in the upward and downward directions (Upward: downward) |  | 4:1 | 3:1 | 2:1 |  |
| Height of air ring from extrusion die (mm) |  | 50 | 100 | 200 | 0 |
| Height of frost line from extrusion die (mm) |  |  | 400 |  |  |
| Forming stability for various film thicknesses (μm) | 60 | Good | Good | Good | Instable |
|  | 100 | Instable | Good | Good | Not formable |
|  | 120 | Not formable | Good | Good | Not formable |
|  | 140 | Not formable | Instable | Good | Not formable |

From the above-described examples and comparative examples, it becomes apparent that the present embodiment makes it possible to effect an excellent cooling, perform the extrusion stably at high speed and a high extrusion output, and further, produce a film having a large thickness as well.

Figure 4:
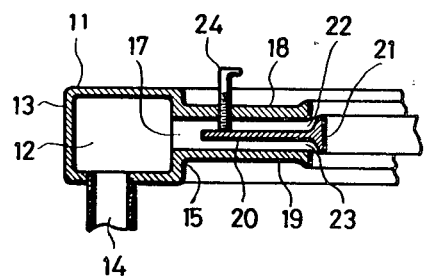
FIG. 4 is an enlarged sectional view showing another example of the air ring used in the forming apparatus.

In embodying the invention, the mounting positions of both the upper vane 18 and the lower vane 19 of the air ring 11 to the annular hollow member 13 through the threaded portion 16 have been made variable, however, this specific form may be replaced by one in which either one of the mounting positions is made displaceable or another one in which the both mounting positions are displaceably fixed as shown in FIG. 4. In this case, if adjusting screws 24 are mounted at predetermined intervals in the circumferential direction on the partition plate 20 in such a manner that the forward ends of the adjusting screws 24 are rotatably and axially unmovable, and the adjusting screws 24 are threadably coupled to the upper vane 18, then rotation of the adjusting screws 24 makes it possible to simultaneously adjust both the upwardly directed slit 22 and the downwardly directed slit 23, so that the quantities of air discharged in the direction of the extrusion of the resin and in the direction opposite to the extrusion of the resin and the angles of discharge can be simultaneously adjusted.

Flowrates of the cooling air discharged in the direction of the extrusion of the resin and in the direction opposite to the extrusion of the resin need not necessarily be adjusted by the means of adjusting the slit widths of the upwardly directed slit 22 and the downwardly directed slit 23, but may be adjusted by a valve mechanism.

Furthermore, the upwardly directed slit 22 and the downwardly directed slit 23 need not necessarily be provided on one and the same annular hollow member 13, that is, the upwardly directed slit 22 and the downwardly directed slit 23 need not be provided on the main body of the air ring simultaneously, and this specific form may be replaced by an arrangement wherein one of two different main bodies of air rings provided contiguously or adjacently is provided with the upwardly directed slit 22 and the other is provided with the downwardly directed slit 23, or the like, for example.

Further, the center core 6 has been provided in the tubular resin 4 as described above, but, the center core 6 need not necessarily be provided. However, the provision of the center core 6 can offer the advantage that the forming stability is enhanced even in the tubular film process of a very thin film at high speed and of a film having a large thickness.

Description will hereunder be given of embodiments other than the above-described first embodiment. Like reference numerals as shown in the first embodiment are used throughout the figures to designate same or similar parts, so that the detailed description will be simplified or omitted.

FIG. 5 shows the second embodiment of the present invention, in which the tubular resin 4 extruded from the extrusion die 1 completes its expansion at a predetermined height, and, in the vicinity of this bubble expansion ending point, there is provided an air ring assembly 31 having a diameter larger than the diameter of the tubular resin 4 after the expansion, i.e., having a diameter sufficiently large and permitting the tubular resin 4 not to contact the air ring 31 in a manner to be vertically movable by a vertically moving device, not shown. Here, the bubble expansion ending point appears at a position slightly closer to the direction of the extrusion than the frost line F. In other words, the frost line F appears immediately before the bubble expansion ending point.

The air ring assembly 31 comprises a downwardly directed air ring 32 and an upwardly directed air ring 33, with these air rings 32 and 33 being disposed contiguously to each other.

A downwardly directed slit 34 of the downwardly directed air ring 32 is directed in the direction opposite to the extrusion of the resin. Depending upon the position where the air ring 31 is disposed and the shape of an expanded portion of the tubular resin 4, the downwardly directed slit 34 may be preferably inclined between 10 and 70 degrees, and more preferably between 10 and 45 degrees when, normally, the direction opposite to the extrusion of the resin is set at zero degree and an inward direction along the radius of the tubular resin 4 is set at 90 degrees (Refer to reference character α in FIG. 5). The cooling air is blown at an angle within the range of angle as described above, so that the cooling air flows from the air ring assembly 31 along the outer peripheral shape of the tubular resin 4 disposed on the side of the extrusion die 1.

Since the surface of the tubular resin 4, against which the cooling air discharged from the downwardly directed slit 34 is directly blown, is solidified to a certain extent, even if the quantity of the cooling air discharged is increased to a considerable extent, irregular breathing or movement in a zigzag fashion are not caused on the tubular resin 4, and the forming stability is not so easily hindered. However, when there is a possibility of hindering the forming stability, the inclination α of the downwardly directed slit 34 should be decreased by a suitable value.

The hot air stream, which tends to rise, being accompanied by the tubular resin 4 along the outer periphery of the tubular resin 4 in the direction of the extrusion of the resin, is expelled from the outer peripheral portion of the tubular resin 4 by the cooling air blown against the tubular resin 4 from the downwardly directed slit 34.

Furthermore, the upwardly directed air ring 33 disposed contiguously to and above the downwardly directed air ring 32 as shown in the drawing is provided with an upwardly directed slit 35 to discharge the cooling air in the direction of the extrusion of the resin, and the cooling air discharged from this upwardly directed slit 35 improves the stability of the tubular resin 4 as a whole.

The present embodiment with the above-described arrangement can offer the following advantages.

The present embodiment is of such an arrangement that the cooling air is discharged from the downwardly directed air ring 32 in the direction opposite to the extrusion of the resin, whereby the hot air stream generated by heat exchange with the tubular resin 4 under high temperature immediately after being extruded from the extrusion die 1 does not accompany the flow of the tubular resin 4 and the tubular resin 4 is constantly exposed to the cooling air under low temperature, so that the cooling effect can be enhanced, thus enabling to form a high quality film at high speed. And yet, the cooling air is blown against the expansion region requiring cooling to the utmost through a very short distance, so that the aforesaid expansion region can be efficiently cooled by the cooling air, which has not been weakened in the flowing velocity.

Since the surface of the tubular resin 4 located at a position where the downwardly directed air ring 32 is disposed is solidified to a certain extent, even if the quantity of the cooling air discharged from the downwardly directed air ring 32 is increased, the forming stability of the tubular resin 4 is not easily hindered, so that the quantity of the cooling air can be increased, thus enabling to enhance the cooling effect from this respect as well.

Even if the position where the air ring assembly 31 is disposed is varied in the vertical direction to a considerable extent, the forming stability is not hindered, and particularly, when the air ring assembly 31 is disposed above the bubble expansion ending point, the forming stability is enhanced to a great extent, and yet, the cooling effect is not lowered.

Further, it suffices that only one air ring assembly is provided in the vicinity of the bubble expansion ending point, so that a very simplified installation can be used, thus enabling to facilitate the operational control and handling.

Moreover, since the air is discharged from the upwardly directed slit 35 in the direction of the flow of the resin, the tubular resin 4 is positioned in a laminar flow of a tubular cooling air identical in the flowing direction therewith, whereby the stability of the air ring assembly 31 in the direction of the extrusion is improved, thus resulting in improved stability of the tubular resin 4 as a whole. Moreover, since the cooling after the bubble expansion is satisfactorily effected, an outstanding advantage can be offered in preventing the blocking of the film being large in thickness from occurring.

Detailed description will hereunder be given of the present embodiment with reference to examples and comparative examples to be described below.

EXAMPLE 7

Low-density polyethylene (density . . . 0.92 g/cm$^3$, melt index . . . 2.4 g/10 min) was continuously extruded from an annular slit 2 having a lip interval 2 mm and a diameter of 200 mm in a screw extruder having a bore diameter of 50 mm and L/D=28, whereby a blown film having a folded width 470 mm and a thickness 30 μm was formed.

Forming temperature . . . 170° C.

Cooling method . . . The air ring assembly 31 comprising the downwardly directed air ring 32 (of a diameter of 390 mm) and the upwardly directed air ring 33 (of a diameter of 390 mm) was disposed at a height 550 mm from the extrusion die 1, the cooling air was discharged from the aforesaid air ring assembly 31 in a direction inclined by 20 degrees from the direction of the extrusion of the resin to the inward direction along the radius of the tubular resin 4, and further, in a direction inclined by 45 degrees from the direction of the extrusion of the resin to the inward direction along the radius of the tubular resin 4.

The results of the evaluation of the forming properties are shown in Table 3.

COMPARATIVE EXAMPLE 3

By use of the same resin, the same extrusion die 1 and the same screw extruder as shown in the aforesaid Example 7, the cooling air was discharged from the air ring provided on the upper surface of the extrusion die 1 and formed with a cooling air discharge opening having a diameter of 300 mm in a direction inclined by 45 degrees from the direction of the extrusion of the resin to the inward direction along the radius of the tubular resin. The results will be shown in Table 3.

COMPARATIVE EXAMPLE 4

A first air ring having a bore diameter of 300 mm is provided on the upper surface of the extrusion die and a second air ring having a bore diameter of 390 mm is provided at a height of 550 mm from the extrusion die. The cooling air was discharged for the cooling from these two air rings in a direction inclined by 45 degrees from the direction of the extrusion of the resin to the inward direction along the radius of the tubular resin. Other conditions were similar to those in the Comparative example 3. The results will be shown in Table 3.

TABLE 3

|  | Example 7 | Comparative example 3 | Comparative example 4 |
|---|---|---|---|
| Formable extrusion output (kg/h) | >60 | 35 | 60 |
| Forming stability | ○ | △ | ○ |
| Transparency of formed film | ○ | X | ○ |
| Operational controllability | ◎ | ◎ | △ |

It becomes apparent from the above-described example and comparative example that the present embodiment, using a mere one-step cooling, has the effect equal to the two-step cooling in the forming properties, stability and transparency, and moreover, is superior to the two-step cooling in the controllability and the formation at high speed.

In addition, a downwardly directed air ring assembly capable of blowing the cooling air in a direction opposite to the extrusion of the resin may be provided between the air ring assembly 31 and the extrusion die 1. The provision of the air ring assemblies capable of discharging the cooling air in the direction opposite to the extrusion of the resin in two steps makes it possible to effectively perform the cooling more suitable for the shape of the tubular resin 4.

FIG. 6 shows the third embodiment of the present invention, in which an air ring 41 is disposed at a point of a predetermined height above the extrusion die 1, the cooling air is discharged from a discharge slit 42 of this air ring 41 in the direction of the extrusion of the resin, so that a first cooling air is blown against the tubular resin 4.

Furthermore, the air ring assembly 31 as shown in the aforesaid third embodiment is disposed in the vicinity of the bubble expansion ending point of the tubular resin 4, and the cooling air discharged from the downwardly directed slit 34 and the upwardly directed slit 35 of the air ring assembly 31 performs the blowing of a second cooling air.

The cooling air discharged from the discharge slit 42 in the direction of the extrusion of the resin and the cooling air discharged from the downwardly directed slit 34 in the direction opposite to the extrusion of the resin impinge upon each other at an immediate point between the upper surface of the extrusion die 1 and the bubble expansion ending point, and flow out in a manner to be pushed outward in the radial direction of the tubular resin 4, whereby the hot air stream generated through the heat exchange between the cooling air and the tubular resin is expelled from the outer peripheral portion of the tubular resin 4.

The present embodiment with the above-described arrangement can offer the following advantages.

The cooling air discharged from the air ring 41 is blown against the tubular resin 4 heated to a high temperature, which has been extruded from the extrusion die 1, and undergoes the heat exchange therewith and is heated to a high temperature. This hot air steam thus heated to a high temperature impinges upon the cooling air discharged downwardly from the air ring assembly 31 and expelled from the outer peripheral portion of the tubular resin 4, whereby the hot air stream does not accompany the flow of the tubular resin 4. In consequence, the tubular resin 4 is constantly exposed to the cooling air of a low temperature, so that the cooling effect can be great.

Moreover, the hot air stream can be expelled without requiring the vacuum attracting mechanism for the hot air stream between the two-step air rings 31 and 41, whereby no large-size installation is needed, thus enabling to facilitate the operational control.

The surface of the tubular resin 4 is solidified to a certain extent at the position where the air ring assembly 31 is disposed, whereby the forming stability of the tubular resin 4 is not easily hindered even if the discharge flowrate of the cooling air from the air ring assembly 31 is increased, so that the discharge flowrate of the cooling air can be increased, thus enabling to improve the cooling effect from this respect as well. In consequence, a high quality film can be formed at high speed.

The present embodiment is advantageous in that the cooling air is blown against the expansion region as being the region requiring to be cooled to the utmost from the two air rings 31 and 41 through a very short distance.

FIG. 7 shows the fourth embodiment of the present invention, in which an air ring 51 is provided in the vicinity of the upper surface of the extrusion die 1. A discharge slit 52 of this air ring 51 is formed into a double slit, inclined from the direction of the extrusion of the resin outwardly to the radial direction of the tubular resin 4, and the cooling air discharged from the discharge slit 52 is a first cooling air blown against the tubular resin 4.

An air ring assembly 31 is disposed in the vicinity of the bubble expansion ending point of the tubular resin 4 in the same manner as in the third embodiment, and this air ring assembly 31 blows a second cooling air against the tubular resin 4.

The fourth embodiment with the above-described arrangement can offer the advantages similar to those in the third embodiment and the following additional advantages. Since the discharge slit 52 of the air ring 51 disposed in the vicinity of the upper surface of the extrusion die 1 is a double slit and inclined from the direction of the extrusion of the resin outwardly to the radial direction of the tubular resin 4, even if resin materials such as chainlike low-density polyethylene, high-density polyethylene and polypropylene are used, the air ring 51 pulls the tubular resin 4, which has been extruded from the extrusion die 1, outwardly in the radial direction thereof through the venturi effect, and fixes it, so that the stable forming can be facilitated.

Detailed description will hereunder be given of the present embodiment with reference to the following examples and comparative examples.

EXAMPLE 8

Low-pressure-processed ethylene-4-methylpentene-1 copolymer (density ... 0.923 g/cm$^3$, melt index ... 2.4 g/10 min) is continuously extruded from an annular slit 2 having a lip interval 2 mm and a diameter of 125 mm in a screw extruder having a bore diameter of 50 mm and L/D=28, whereby a blown film having a folded width 300 mm and a thickness 30 μm is formed.

Forming temperature ... 170° C.

Cooling method ... The double-slit type air ring 51 (of a diameter 150 mm) was disposed in the vicinity of the upper surface of the extrusion die 1, out of the discharge slits 52, the slit disposed at the outer side discharged the cooling air in a direction inclined by 20 degrees outwardly from the radial direction of the tubular resin with respect to the direction of the extrusion of the resin and the slit disposed at the inner side discharged the cooling air in a vertical direction along the direction of the extrusion of the resin, whereby a first blowing of the cooling air was performed. Furthermore, the air ring assembly 31 was disposed at a point 500 mm above the extrusion die 1, and the cooling air was discharged from this air ring assembly 31 in the direction of the extrusion of the resin and in the direction opposite to the extrusion of the resin, whereby a second blowing of the cooling air was performed.

The results of evaluation of the forming properties and the like will be shown in Table 4.

COMPARATIVE EXAMPLE 5

The formation was performed in the same manner as in the aforesaid Example 8 except that, in place of the blowing of the cooling air by use of the air ring assembly 31, an air ring to dischage the cooling air only in the direction of the extrusion of the resin was disposed in the vicinity of the bubble expansion ending point and a second blowing of the cooling air was performed by this air ring. The results will be shown in Table 4.

COMPARATIVE EXAMPLE 6

The formation was performed in the same manner as in the aforesaid Example 8 except that a first air ring (of a diameter 300 mm) was disposed in the vicinity of the upper surface of the extrusion die, a second air ring was disposed at a point 500 mm above the extrusion die, the cooling air was discharged from these first and second air rings in a direction inclined by 45 degrees inwardly to the radial direction of the tubular resin with respect to the direction of the extrusion of the resin, whereby first and second blowings of the cooling air were performed. The results will be shown in Table 4.

TABLE 4

|  | Example 8 | Comparative example 5 | Comparative example 6 |
|---|---|---|---|
| Forming stability | ◎ | ○ | △ |
| Formable extrusion output (Kg/h) | 51 | 40 | 30 |
| Cooling effect | ◎ | ○ | △ |
| Physical properties of a film |  |  |  |
| Haze (%) *1 | 9 | 9 | 8 |
| Gloss (%) *2 | 102 | 106 | 100 |
| Tear strength MD/TD (Kg/cm) *3 | 98/248 | 99/219 | 112/212 |
| Impact strength (Kg · cm/cm) *4 | 2490 | 2630 | 2680 |
| Puncture resistance (Kg · cm/cm) *5 | 15000 | 13800 | 13800 |

*1 Haze ... Based upon ASTM (American Society for Testing Materials) D 1003.
*2 Gloss ... Based upon ASTM D 523.
*3 Tear strength ... Based upon JIS (Japanese Industrial Standard) Z 1702.
*4 Impact strength ... A film was fixed in a ring shape, the film was punched by use of a pendulum having an impact head of one inch, and a value of energy required for this was measured (film impact method). The testing equipment used was an impact tester made by Toyo Seiki Seisakusho.
*5 Puncture resistance ... Based upon JIS P 8134.

It becomes apparent from the above-described example and comparative example that, according to the present embodiment, the cooling effect is high, the formation of high extrusion output can be stably performed, and moreover, no accurate alignment is required because the height of the position of the air ring assembly 31 is not strictly required, thus enabling to facilitate the operation.

Figure 8:
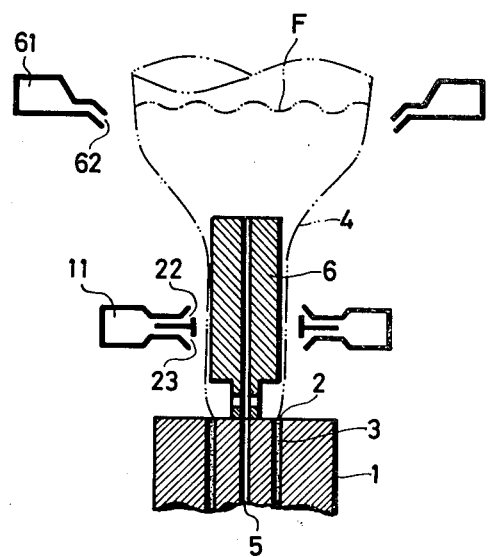

FIG. 8 shows the fifth embodiment of the present invention, in which the center core 6 and the air ring 11 are provided in the same manner as in the aforesaid first embodiment, however, differing from the aforesaid first embodiment, an air ring 61 is disposed in the vicinity of the bubble expansion ending point, and the cooling air is discharged from a discharge slit 62 of this air ring 61 in the direction opposite to the extrusion of the resin, whereby a second blowing of the cooling air against the tubular resin 4 is performed.

According to this fifth embodiment, even if a change in diameter in the expanded portion of the tubular resin 4 is rapid, the expanded portion can be satisfactorily cooled, i.e., the tubular resin 4 can be effectively cooled irrespective of its shape, because the cooling air is blown against the expanded portion from both the discharge slit 62 and the upwardly directed slit 22, respectively.

Figure 9:
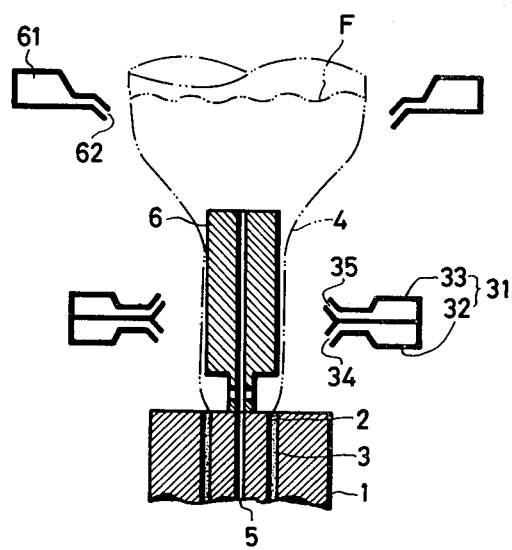

FIG. 9 shows the sixth embodiment of the present invention, in which the same arrangement as in the fifth embodiment is adopted except that, in place of the air ring 11, the air ring assembly 31 is used. This sixth embodiment with the above-described arrangement can offer the advantages similar to the fifth embodiment.

In addition, in the fifth and sixth embodiments, the air ring 61 having the downwardly directed discharge slit 62 may be replaced by the aforesaid air ring assembly 11 or 31 capable of discharging the cooling air both upwardly and downwardly. In this case, the tubular resin 4 after the expansion is disposed in a tubular laminar flow of the cooling air discharged from the air ring assembly 11 or 31 in the direction of the extrusion of the resin, whereby the forming stability is further improved, so that the tubular resin 4 after the expansion can be effectively cooled, thus enabling to eliminate the possibility of occurence of blocking in the case of a film of a large thickness and the like.

In the foregoing, description has been given of the case where the tubular film process according to the present invention is applied to the formation through the upwardly directed blowing, however, the process can be applied to the formation through downwardly directed blowing and the formation through laterally directed blowing. Furthermore, the process need not necessarily be applied to the formation of a single-layer film, but can be applied to the formation of a multi-layer film.

Furthermore, the aforesaid air ring assembly 11 or 31 has been provided thereon with the vertically moving device, but the vertically moving device need not necessarily be provided. However, the provision of the vertically moving device makes it possible that the position of the air rings 11 and 31 can be easily adjusted, moreover, and the position of the air ring 11 or 31 can be disposed in the vicinity of the upper surface of the extrusion die 1 at the start of operation, and thereafter, can be gradually raised in accordance with the rise of the expanded portion of the tubular resin 4 to finally reach a predetermined position, thereby enabling to smoothly operate from the start of operation to the stable formation.

As has been described hereinabove, the present invention can provide a tubular film process wherein no complicated installation is needed, the operation is facilitated, further, the cooling effect is high, and a high quality film can be easily formed at high speed.

What is claimed is:

1. In a process for continuously forming a tubular film including the steps of extruding a molten thermoplastic resin from an extrusion die to form a tube of molten resin, inflating said tube internally to increase the diameter of said tube to convert it to a tubular film, cooling said tube by flowing cooling gas against the exterior of said tube, and taking up the cooled, inflated tubular film, wherein the improvement comprises: flowing a first cooling gas stream against said tube in a direction opposite to the direction of movement of said tube and flowing a second cooling gas stream against said tube in the same direction as the direction of movement of said tube, said first cooling gas stream being located closer to said extrusion die than said second cooling gas stream and said first and second streams being divergent, said first and second streams originating at positions spaced from said extrusion die by distances in the range of from 0.1 H to 0.9 H, wherein H is defined as the distance between said extrusion die and the frost line on the inflated portion of said tubular film at which frost line the resin becomes solidified, said second stream having a higher flow rate than said first stream.

2. A process as claimed in claim 1, wherein said first and second cooling gas streams are emitted from a pair of slits in an air ring that surrounds said tube.

3. A process as claimed in claim 2, further comprising steplessly adjusting the flow rate of at least one of said first and second air streams by adjusting the size of one of said slits.

4. A process as claimed in claim 1 including the step of flowing a third stream of cooling gas against said tube at a location close to said extrusion die and disposed between said extrusion die and the zone at which said first cooling gas stream contacts said tube. said third stream of cooling gas being flowed in the same direction as the direction of movement of said tube.

5. A process as claimed in claim 4, wherein said first and second cooling gas streams are emitted from a pair of slits in an air ring that surrounds said tube.

6. A process as claimed in claim 5, further comprising steplessly adjusting the flow rate of at least one of said first and second air streams by adjusting the size of one of said slits.

7. A process as claimed in claim 5, wherein said third air stream is emitted from a pair of adjacent discharge slits of a second air ring that surrounds said tube, said adjacent discharge slits directing said third air stream parallel to the direction of extrusion of said tube.

8. A process as claimed in claim 1 including the step of flowing a third stream of cooling gas against said tube at a location disposed between the zone at which said second cooling gas stream contacts said tube and said front line, said third stream of cooling gas being flowed in a direction opposite to the direction of movement of said tube.

9. A process as claimed in claim 8, wherein said first and second cooling gas streams are emitted from a pair of slits in an air ring that surrounds said tube.

10. A process as claimed in claim 8, further comprising steplessly adjusting the flow rate of at least one of said first and second air streams by adjusting the size of one of said slits.

11. In a process for continuously producing a tubular thermoplastic film including the steps of extruding molten thermoplastic resin through an extrusion die to form a tube of said molten resin, introducing pressurized gas into said tube to effect expansion of the diameter of said tube as said tube moves away from the extrusion die whereby to convert said tube into a tubular film and flowing first and second annular streams of cooling gas in contact with the outer surface of said tube as it moves away from the extrusion die whereby to cool said tube, wherein said first stream is located closer to said extrusion die and the direction of flow of said first stream is opposite to the direction of movement of said tube and said second stream is located farther from said extrusion die and the direction of flow of said second stream is the same as the direction of movement of said tube, said tube exhibiting a frost line at the location at which the resin is changed from a molten state to a solidified state and said tube reaching its maximum diameter immediately after said frost line, the improvement which comprises: said first and second annular streams of cooling gas are supplied from first and second nozzles disposed in side-by-side relation on a single ring that surrounds said tube and is spaced from the extrusion die a distance in the range of from 0.1 H to 0.9 H, wherein H is the distance between said extrusion die and said frost line, said second stream of cooling gas has a higher flow rate than said first stream of cooling gas, and said first and second streams of cooling gas are emitted from said nozzles at acute angles relative to the outer surface of the tube.

12. A process as claimed in claim 11, wherein said second stream is directed against an annular expansion region of said tubular film in which the size of said tubular film is continuously increasing.

13. A process as claimed in claim 11, in which the ratio of the quantity of cooling gas discharged from said second nozzle forming said second stream to the cooling gas discharged from said first nozzle forming said first stream is in the range of 5:1 to 2:1, said air ring is spaced apart from said extrusion die by a distance in the range of 0.125 H to 0.5 H and said first and second streams are emitted from said nozzles at angles of about 75° relative to a line normal to the outer surface of the tube.

14. A process as claimed in claim 11 in which said tube encircles a center core that projects from the extrusion die, said core having a passage for flowing said compressed gas into the interior of said tube, said ring being disposed in radially opposed relation to said core and said frost line being formed at a location beyond the outer end of said core.

* * * * *